United States Patent
Kubota et al.

(10) Patent No.: US 9,244,254 B2
(45) Date of Patent: Jan. 26, 2016

(54) IMAGING LENS

(71) Applicants: OPTICAL LOGIC INC., Nagano (JP); KANTATSU CO., LTD., Tochigi (JP)

(72) Inventors: Yoji Kubota, Nagano (JP); Kenichi Kubota, Nagano (JP); Hitoshi Hirano, Nagano (JP); Ichiro Kurihara, Tochigi (JP); Tomohiro Yonezawa, Tochigi (JP)

(73) Assignees: OPTICAL LOGIC INC., Nagano (JP); KANTATSU CO., LTD., Tochigi (JP)

( * ) Notice: Subject to any disclaimer, the term of this patent is extended or adjusted under 35 U.S.C. 154(b) by 43 days.

(21) Appl. No.: 14/308,743

(22) Filed: Jun. 19, 2014

(65) Prior Publication Data
US 2015/0029603 A1    Jan. 29, 2015

(30) Foreign Application Priority Data
Jul. 29, 2013   (JP) .................................. 2013-156592

(51) Int. Cl.
*G02B 9/12* (2006.01)
*G02B 13/00* (2006.01)

(52) U.S. Cl.
CPC .................................. *G02B 13/0035* (2013.01)

(58) Field of Classification Search
CPC ................................................... G02B 13/0035
USPC .......... 359/716, 735, 748, 753, 780, 792, 784
See application file for complete search history.

(56) References Cited

U.S. PATENT DOCUMENTS 7,564,635 B1 *  7/2009  Tang ........................ G02B 9/12
                                                              359/716

FOREIGN PATENT DOCUMENTS

JP      2012-014139 A      1/2012

* cited by examiner

*Primary Examiner* — Scott J Sugarman
*Assistant Examiner* — Vipin Patel

(57) ABSTRACT

An imaging lens includes a first lens having positive refractive power; a second lens having positive refractive power; and a third lens having positive refractive power, arranged in the order from an object side to an image plane side. The first lens and the third lens have object-side surfaces and image plane-side surfaces, curvature radii of which are both positive. When the first lens has refractive power P1, the second lens has refractive power P2, the third lens has refractive power P3, the first lens has a focal length f1, and the third lens has a focal length f3, the imaging lens satisfies the following conditional expressions:

$5.0 < (P1+P3)/P2 < 8.5$ $6 < f3/f1 < 30$.

5 Claims, 15 Drawing Sheets

IMAGING LENS

BACKGROUND OF THE INVENTION AND RELATED ART STATEMENT

The present invention relates to an imaging lens for forming an image of an object on an imaging element such as a CCD sensor and a CMOS sensor. In particular, the present invention relates to an imaging lens suitable for mounting in a relatively small camera, such as a camera for mounting in a portable device, e.g., a cellular phone, a smartphone, a portable information terminal, and a digital still camera, a security camera, a vehicle onboard camera, and a network camera.

In these years, in place of cellular phones that are intended mainly for making phone calls, so-called "smartphones" have been more widely used, i.e., cellular phones with such functions as portable information terminals (PDA) and/or personal computers. Since the smartphones generally are highly functional as opposed to the cellular phones, it is possible to directly process images taken by a camera thereof in various applications without importing in personal computers or the like. In case of the smartphones, it is possible to use the images taken with the cameras thereof in various applications. For example, it is possible to use the images for game characters of online games or for models in makeup simulations. Such uses of the images, which were not conventionally common, are becoming increasingly popular every year.

Generally speaking, an imaging lens for mounting in a portable device such as a cellular phone or a smartphone, which is developed for advanced users, requires optical performances comparable to digital still cameras, including high resolution and color reproducibility, as well as a small size due to limited space in a portable device. On the other hand, in case of uses in the above-described applications, it is not always necessary that an imaging lens for mounting in a camera has high resolution, but rather, it is more important that an imaging lens has a wide angle of view, i.e., a wide angle, for some applications.

A lens configuration composed of three lenses can relatively satisfactorily correct aberrations and is also suitable for downsizing, so that it has been widely used as a lens configuration for the above-described imaging lens of a camera for mounting in a portable device. When the imaging lens has the three-lens configuration, one of most well-known configurations includes a first lens having positive refractive power, a second lens having negative refractive power, and a third lens having positive or negative refractive power, arranged in the order from an object side.

According to the lens configuration described above, the second lens has negative refractive power. Accordingly, it is relatively easy to achieve downsizing of the imaging lens. In addition, since it is also possible to correct a chromatic aberration generated in the first lens through the second lens, it is one of effective lens configurations in view of downsizing of an imaging lens and satisfactory correction of aberrations.

According to the lens configuration described above, however, the second lens has negative refractive power. Accordingly, when it is attempted to achieve both a small size of an imaging lens and a wide angle, refractive power of each lens tends to be relatively strong. Further, it is often necessary to increase fabrication accuracy and/or assembling accuracy of the lens. For this reason, recently, there has been also a proposal of a lens configuration, in which refractive powers of all the three lenses are positive. As an imaging lens having such three-lens configuration, for example, there is known the one described in Patent Reference.

Patent Reference: Japanese Patent Application Publication No. 2012-14139

According to the imaging lens disclosed in Patent Reference, the second lens and the third lens are formed to have aspheric surfaces having inflexion points. When the lenses have the aspheric surfaces, it is achievable to obtain a small size of the imaging lens and a wide angle, as well as satisfactorily correcting aberrations.

According to the imaging lens described in Patent Reference, it is achievable to downsize the imaging lens while satisfactorily correcting aberrations to some extent. However, uses of images taken with a camera have been more and more various each year, and even wider angle is demanded as one of added values of the imaging lens. Although the imaging lens described in Patent Reference has a wider angle than conventional one, there is a limit itself in achieving even wider angle.

Here, it is not a problem specific to an imaging lens for mounting in a portable device such as cellular phone or smartphone to attain both a small size and a wide angle while satisfactorily correcting aberrations. Such a problem is common also among imaging lenses for mounting in relatively small cameras such as digital still cameras, security cameras, vehicle onboard cameras, and network cameras.

In view of the above-described problems in conventional techniques, an object of the present invention is to provide an imaging lens that can attain both a small size and a wide angle, while satisfactorily correcting aberrations.

Further objects and advantages of the invention will be apparent from the following description of the invention.

SUMMARY OF THE INVENTION

In order to attain the objects described above, according to a first aspect of the present invention, an imaging lens includes a first lens having positive refractive power; a second lens having positive refractive power; and a third lens having positive refractive power, arranged in the order from an object side to an image plane side. The first lens and the third lens have object-side surfaces and image plane-side surfaces, curvature radii of which are both positive. When the first lens has a refractive power P1, the second lens has a refractive power P2, the third lens has a refractive power P3, the first lens has a focal length f1, and the third lens has a focal length f3, the imaging lens of the invention satisfies the following conditional expressions (1) and (2):

$$5.0 < (P1+P3)/P2 < 8.5 \tag{1}$$

$$6 < f3/f1 < 30 \tag{2}$$

As described above, according to the imaging lens having the three-lens configuration, in which the second lens has negative refractive power, in an attempt to attain both a small size of the imaging lens and a wide angle, each lens tends to have relatively strong refractive power. Consequently, it is necessary to enhance fabrication accuracy and assembly accuracy of the lens. According to the imaging lens of the invention, since all the lenses have positive refractive power, it is possible to enhance refractive power of the whole lens system while relatively weakening refractive power of each lens. For this reason, it is possible to satisfactorily achieve both downsizing and a wider angle. In addition, since refractive power of each lens that composes the imaging lens is relatively weak, the surface shape of each lens is gently-curved one, so that it is possible to improve fabrication property and assembling property of the imaging lens.

When the imaging lens satisfies the conditional expression (1), which expresses a ratio of the refractive powers of the first lens and the third lens to that of the second lens, it is possible to satisfactorily correct a chromatic aberration of magnification and a field curvature, while attaining a small size of the imaging lens. When the value exceeds the upper limit of "8.5", the refractive powers of the first lens and the third lens are strong relative to the refractive power of the whole lens system, and although it is advantageous for correcting an axial chromatic aberration, the chromatic aberration of magnification of an off-axis light beam is insufficiently corrected (an image-forming point at a short wavelength moves toward an optical axis relative to an image-forming point at a reference wavelength) and an image-forming surface curves to a side of the image plane, so that it is difficult to obtain satisfactory image-forming performance.

In addition, a position of an exit pupil moves toward the object side, which makes a back focal length long, so that it is difficult to downsize the imaging lens. On the other hand, when the value is below the lower limit of "5.0", the refractive power of the second lens is strong relative to the refractive power of the whole lens system, although it is advantageous for downsizing of the imaging lens, the image-forming surface curves to the object side. Therefore, also in this case, it is difficult to obtain satisfactory image-forming performance.

Here, according to the invention, the shape of a lens is specified using a positive or negative sign of a curvature radius, but whether a curvature radius is positive or negative is determined by the general definition, i.e., with a traveling direction of a light beam is positive, when a center of a curvature of a lens surface is on a side of an image plane, the curvature radius is considered as positive, and when it is on an object side, the curvature radius is considered as negative. In addition, in this specification, the imaging lens is assumed to be disposed in air for convenience.

In attempt to achieve a wide angle of the imaging lens, when the size of the image plane of the imaging element is the same as that of a conventional imaging lens, a focal length of the imaging lens has to be short. As the focal length becomes short, the total length of the imaging lens becomes short relative to the size of the image plane of the imaging element, so that it is difficult to restrain an incident angle of a light beam emitted from the imaging lens to the imaging element within the range of incident angles of a light beam that can be taken in the imaging element, i.e., so-called "chief ray angle (CRA)".

When the imaging lens satisfies the conditional expression (2), it is achievable to downsize the imaging lens, as well as achieving a wide angle while restraining the incident angle of a light beam emitted from the imaging lens to the imaging element within the range of the chief ray angle. In addition, when the imaging lens satisfies the conditional expression (2), it is also possible to restrain an astigmatism, a chromatic aberration, and a distortion within satisfactory ranges in a well-balanced manner.

When the value exceeds the upper limit of "30", although it is advantageous for downsizing of the imaging lens, an astigmatic difference increases at the periphery of an image, so that it is difficult to obtain satisfactory image-forming performance. Furthermore, since it is also difficult to restrain an incident angle of a light beam emitted from the imaging lens to the imaging element within the range of the chief ray angle, so that, so-called "shading", a phenomenon of dark image at the periphery relative to a center of the image, easily occurs.

On the other hand, when the value is below the lower limit of "6", although it is easy to restrain an incident angle of a light beam emitted from the imaging lens to the imaging element within the range of the chief ray angle, since a chromatic aberration of magnification is insufficiently corrected at the image periphery and the distortion increases, it is difficult to obtain satisfactory image-forming performance.

When a distance on an optical axis between an image plane-side surface of the first lens and an object-side surface of the second lens is D12 and a distance on an optical axis between an image plane-side surface of the second lens and an object-side surface of the third lens is D23, the imaging lens having the above-described configuration preferably satisfies the following conditional expression (3):

$$0.5 < D12/D23 < 1.0 \tag{3}$$

When the imaging lens satisfies the conditional expression (3), it is possible to restrain the field curvature, the astigmatism, and the distortion within satisfactory ranges in a well-balanced manner, while restraining the incident angle of a light beam emitted from the imaging lens to the imaging element within the range of the chief ray angle.

When the value exceeds the upper limit of "1.0", although it is easy to restrain the incident angle of a light beam emitted from the imaging lens to the imaging element within the range of the chief ray angle, the astigmatic difference increases, so that it is difficult to obtain satisfactory image-forming performance.

On the other hand, when the value is below the lower limit of "0.5", the distortion increases and the image-forming surface curves to the object side, so that it is difficult to obtain satisfactory image-forming performance. In addition, it is difficult to restrain the incident angle of a light beam emitted from the imaging lens to the imaging element within the range of the chief ray angle, so that shading easily occurs.

When the second lens has a focal length f2, the imaging lens having the above-described configuration preferably satisfies the following conditional expression (4):

$$0.1 < f1/f2 < 0.3 \tag{4}$$

When the imaging lens satisfies the conditional expression (4), it is possible to restrain the field curvature, the astigmatism, and the distortion within satisfactory ranges in a well-balanced manner, while attaining a small size of the imaging lens. When the value exceeds the upper limit of "0.3", the first lens has weak refractive power relative to the refractive power of the second lens, so that, although it is advantageous for correction of a distortion, it is difficult to downsize the imaging lens. In addition, since an astigmatic difference increases, it is difficult to obtain satisfactory image-forming performance.

On the other hand, when the value is below the lower limit of "0.1", the first lens has strong refractive power relative to the refractive power of the second lens, which is advantageous for downsizing of the imaging lens, but the image-forming surface curves to the object side and it is difficult to obtain satisfactory image-forming performance.

When the whole lens system has a focal length f and the second lens has a focal length f2, the imaging lens having the above-described configuration preferably satisfies the following conditional expression (5):

$$5 < f2/f < 10 \tag{5}$$

When the imaging lens satisfies the conditional expression (5), it is possible to satisfactorily correct an astigmatism and a field curvature while downsizing the imaging lens. When the value exceeds the upper limit of "10", the second lens has weak refractive power relative to the refractive power of the whole lens system, so that the first lens and the third lens have strong refractive power relative to the refractive power of the whole lens system. For this reason, although it is advantageous for downsizing of the imaging lens, the astigmatic difference increases and the image-forming surface curves to the object side. As a result, it is difficult to obtain satisfactory image-forming performance.

On the other hand, when the value is below the lower limit of "5", the second lens has strong refractive power relative to the refractive power of the whole lens system, so that the first lens and the third lens have weak refractive power relative to the refractive power of the whole lens system. For this reason, it is difficult to downsize the imaging lens and the image-forming surface curves to the image plane side, so that it is difficult to obtain satisfactory image-forming performance.

In order to more satisfactorily correct a chromatic aberration, when the first lens has an Abbe's number vd1, the second lens has an Abbe's number vd2, and the third lens has an Abbe's number vd3, the imaging lens having the above-described configuration preferably satisfies the following conditional expressions (6) to (8):

$$45<vd1<75 \quad (6)$$

$$45<vd2<75 \quad (7)$$

$$45<vd3<75 \quad (8)$$

When the imaging lens satisfies the conditional expressions (6) to (8), each lens of the first to the third lenses has a large Abbe's number, so that it is possible to restrain generation of a chromatic aberration that is generated when a light beam passes through each lens, and thereby it is possible to suitably restrain a chromatic aberration of the imaging lens.

According to the imaging lens of the invention, it is possible to provide an imaging lens, which can attain both a small size and a wide angle while satisfactorily correcting aberrations.

DETAILED DESCRIPTION OF PREFERRED EMBODIMENTS

Hereunder, referring to the accompanying drawings, an embodiment of the present invention will be fully described.

FIGS. 1, 4, 7, 10, and 13 are schematic sectional views of imaging lenses in Numerical Data Examples 1 to 5 according to the embodiment, respectively. Since a basic lens configuration is the same among those Numerical Data Examples, the lens configuration of the embodiment will be described with reference to the illustrative sectional view of Numerical Data Example 1.

Figure 1:
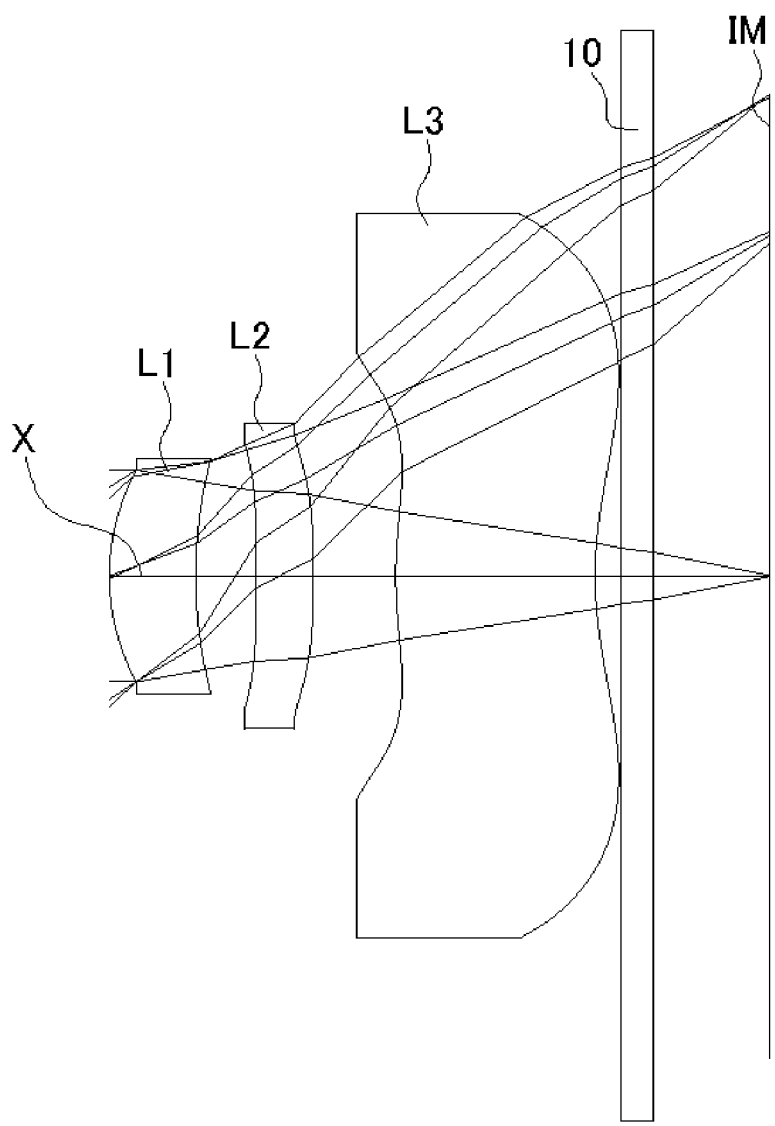
FIG. 1 is a sectional view of a schematic configuration of an imaging lens in Numerical Data Example 1 according to an embodiment of the invention.

As shown in FIG. 1, the imaging lens of the embodiment includes a first lens L1 having positive refractive power, a second lens L2 having positive refractive power, and a third lens L3 having positive refractive power, arranged in the order from an object side to an image plane side. A filter 10 may be provided between the third lens L3 and an image plane IM of an imaging element. The filter 10 may be optionally omitted. In the imaging lens of the embodiment, there is provided an aperture stop on an object-side surface of the first lens L1.

The first lens L1 is formed in a shape such that a curvature radius r1 of an object-side surface thereof and a curvature radius r2 of an image plane-side surface thereof are both positive, and has a shape of a meniscus lens directing a convex surface thereof to the object side near the optical axis X.

The second lens L2 is formed in a shape such that a curvature radius r3 of an object-side surface thereof is positive and a curvature radius r4 of an image plane-side surface thereof is negative, and has a shape of a biconvex lens near the optical axis X. Here, the shape of the second lens L2 is not limited to the one in this embodiment. Other than the one described in this embodiment, the second lens L2 can be formed in a shape such that the curvature radius r4 of the image plane-side surface is positive, i.e., a shape of a meniscus lens directing a convex surface thereof to the object side near the optical axis X, or such that the curvature radius r3 is negative, i.e., a shape of a meniscus lens directing a concave surface thereof to the object side near the optical axis X.

Numerical Data Examples 1, 2, and 4 are examples, in which the second lens L2 has a shape of a biconvex lens near the optical axis X. Numerical Data Example 3 is an example, in which the second lens L2 has a shape of a meniscus lens directing a convex surface thereof to the object side near the optical axis X. Moreover, Numerical Data Example 5 is an example, in which the second lens L2 has a shape of a meniscus lens directing a concave surface thereof to the object side near the optical axis X.

The third lens L3 is formed in a shape such that a curvature radius r5 of an object-side surface thereof and a curvature radius r6 of an image plane-side surface thereof are both positive, and has a shape of a meniscus lens directing a convex surface thereof to the object side near the optical axis X. The third lens L3 is formed as an aspheric shape, and an object-side surface and image plane-side surface thereof respectively have an inflexion point. Therefore, the third lens L3 has a shape of a meniscus lens directing a convex surface thereof to the object side near the optical axis X, and has a shape of a meniscus lens directing a concave surface thereof to the object side at the periphery of the lens. With such surface shapes of the third lens L3, it is possible to suitably restrain the incident angle of a light beam emitted from the imaging lens to the image plane IM within the range of the chief ray angle (CRA).

Furthermore, the imaging lens of the embodiment satisfies the following conditional expressions (1) to (8):

$$5.0 < (P1+P3)/P2 < 8.5 \quad (1)$$

$$6 < f3/f1 < 30 \quad (2)$$

$$0.5 < D12/D23 < 1.0 \quad (3)$$

$$0.1 < f1/f2 < 0.3 \quad (4)$$

$$5 < f2/f < 10 \quad (5)$$

$$45 < vd1 < 75 \quad (6)$$

$$45 < vd2 < 75 \quad (7)$$

$$45 < vd3 < 75 \quad (8)$$

In the above conditional expressions:
P1: Refractive power of a first lens L1
P2: Refractive power of a second lens L2
P3: Refractive power of a third lens L3
f: Focal length of the whole lens system
f1: Focal length of a first lens L1
f2: Focal length of a second lens L2
f3: Focal length of a third lens L3
D12: Distance on the optical axis X from an image plane-side surface of the first lens L1 to an object-side surface of the second lens L2
D23: Distance on the optical axis X from an image plane-side surface of the second lens L2 to an object-side surface of the third lens L3
vd1: Abbe's number of a first lens L1
vd2: Abbe's number of a second lens L2
vd3: Abbe's number of a third lens L3

Here, it is not necessary to satisfy all of the conditional expressions, and it is achievable to obtain an effect corresponding to the respective conditional expression when any single one of the conditional expressions is individually satisfied.

In the embodiment, all lens surfaces of the first lens L1 to the third lens L3 are formed as an aspheric surface. When the aspheric surfaces applied to the lens surfaces have an axis Z in a direction of the optical axis X, a height H in a direction perpendicular to the optical axis X, a conical coefficient k, and aspheric coefficients $A_4, A_6, A_8, A_{10}, A_{12}, A_{14},$ and $A_{16}$, a shape of the aspheric surfaces of the lens surfaces is expressed as follows:

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} \quad \text{Formula 1}$$

Next, Numerical Data Examples of the imaging lens of the embodiment will be described. In each Numerical Data Example, f represents a focal length of the whole lens system, Fno represents an F number, and ω represents a half angle of view, respectively. In addition, i represents a surface number counted from the object side, r represents a curvature radius, d represents a distance between lens surfaces (surface spacing) on the optical axis, nd represents a refractive index for a d line (a reference wavelength), and vd represents Abbe's number for the d line, respectively. Here, aspheric surfaces are indicated with surface numbers i affixed with * (asterisk). Here, a sum of surface spacing from the object-side surface of the first lens L1 to the image plane IM (the length of the filter 10 is the length in air) on the optical axis X is indicated as La.

NUMERICAL DATA EXAMPLE 1

Basic data are shown below.

f = 2.44 mm, Fno = 2.5, ω = 42.7°
Unit: mm

Surface Data

| Surface Number i | r | d | nd | vd |
|---|---|---|---|---|
| (Object) | ∞ | ∞ | | |
| 1* (Stop) | 1.040 | 0.396 | 1.5346 | 56.1 |
| 2* | 2.201 | 0.278 (=D12) | | |
| 3* | 125.618 | 0.259 | 1.5346 | 56.1 |
| 4* | −14.232 | 0.378 (=D23) | | |
| 5* | 1.914 | 0.913 | 1.5346 | 56.1 |
| 6* | 1.737 | 0.120 | | |
| 7 | ∞ | 0.150 | 1.5168 | 64.2 |
| 8 | ∞ | 0.528 | | |
| (Image plane) | ∞ | | | | f1 = 3.30 mm
f2 = 23.93 mm
f3 = 44.23 mm
La = 2.97 mm

Aspheric Surface Data

First Surface k = 0.000, $A_4$ = −2.639E−03, $A_6$ = 1.070, $A_8$ = −3.922,
$A_{10}$ = −2.016E+1, $A_{12}$ = 7.498E+01, $A_{14}$ = 3.081E+02,
$A_{16}$ = −1.097E+03
Second Surface k = 0.000, $A_4$ = −2.810E−03, $A_6$ = −1.371E−01, $A_8$ = 3.370,
$A_{10}$ = −9.748, $A_{12}$ = −2.277E+01, $A_{14}$ = 1.283E+02,
$A_{16}$ = −1.747E+02
Third Surface k = 0.000, $A_4$ = −9.117E−01, $A_6$ = 4.168, $A_8$ = −1.704E+01,
$A_{10}$ = 3.536E+01, $A_{12}$ = −2.068E+01, $A_{14}$ = 8.649,
$A_{16}$ = −7.136E+01
Fourth Surface k = 0.000, $A_4$ = −1.058, $A_6$ = 3.044, $A_8$ = −7.300, $A_{10}$ = 1.019E+01,
$A_{12}$ = −2.307, $A_{14}$ = 1.513, $A_{16}$ = −4.870
Fifth Surface k = 0.000, $A_4$ = −6.571E−01, $A_6$ = 3.139E−01, $A_8$ = −1.594E−01,
$A_{10}$ = −2.094E−01, $A_{12}$ = 3.162E−01, $A_{14}$ = 2.091E−02,
$A_{16}$ = −7.241E−02
Sixth Surface k = 0.000, $A_4$ = −2.403E−01, $A_6$ = 1.316E−02, $A_8$ = 3.097E−02,
$A_{10}$ = −1.160E−02, $A_{12}$ = −7.624E−03, $A_{14}$ = 5.286E−03,
$A_{16}$ = −9.037E−04

The values of the respective conditional expressions are as follows:

(P1 + P3)/P2 = 7.80 f = 2.44 mm, Fno = 2.5, ω = 42.7°
Unit: mm

D12/D23 = 0.74
f3/f1 = 13.42
f1/f2 = 0.14
f2/f = 9.79

Accordingly, the imaging lens of Numerical Data Example 1 satisfies the above-described conditional expressions. The ratio of the sum of surface spacing La to the focal length f (La/f) is 1.22, and downsizing of the imaging lens is suitably achieved. Here, the respective lenses that compose the imaging lens of Numerical Data Example 1 are made of the same material and the manufacturing cost of the imaging lens is suitably restrained.

Figure 2:
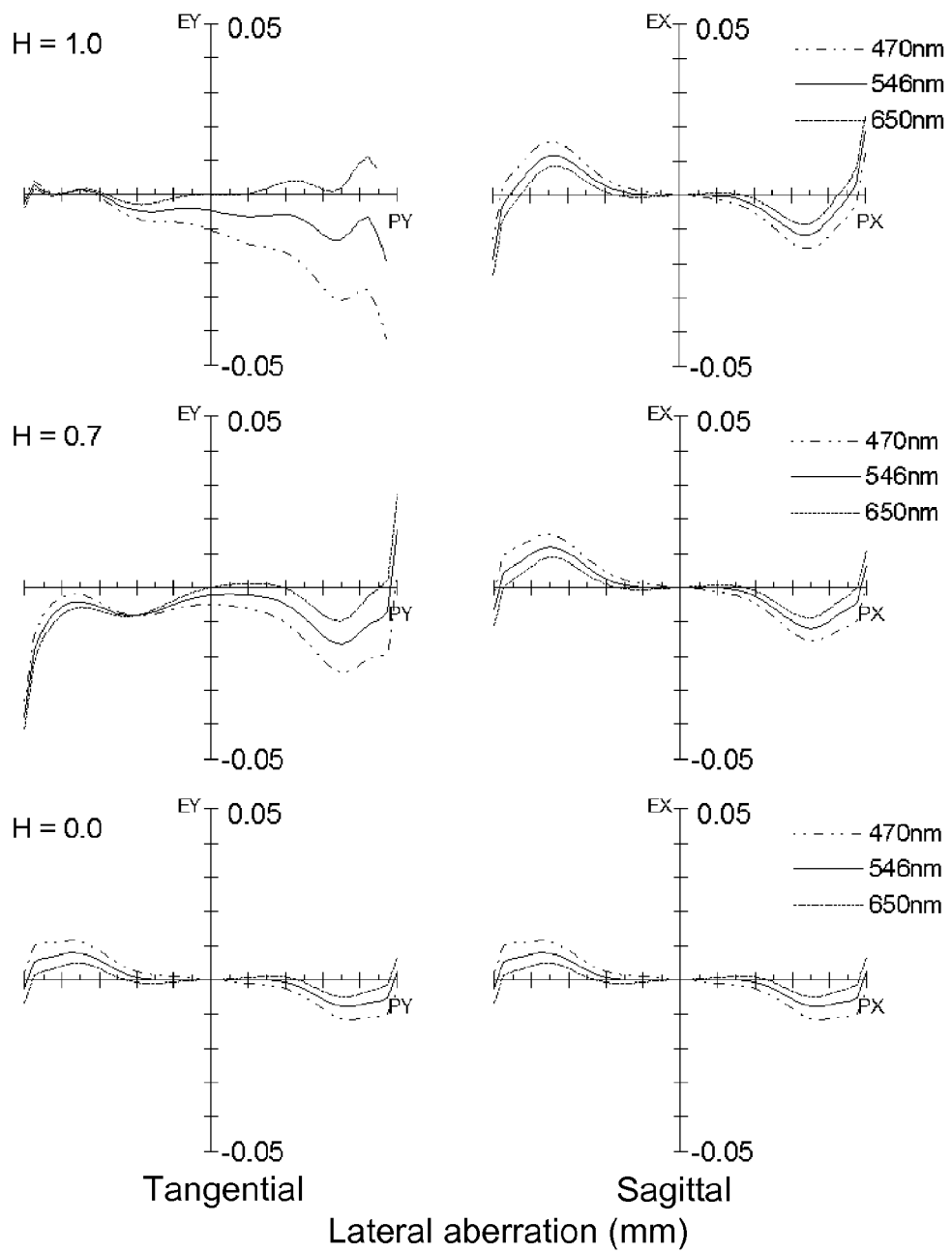
FIG. 2 is an aberration diagram showing a lateral aberration of the imaging lens of FIG. 1.
Figure 3:
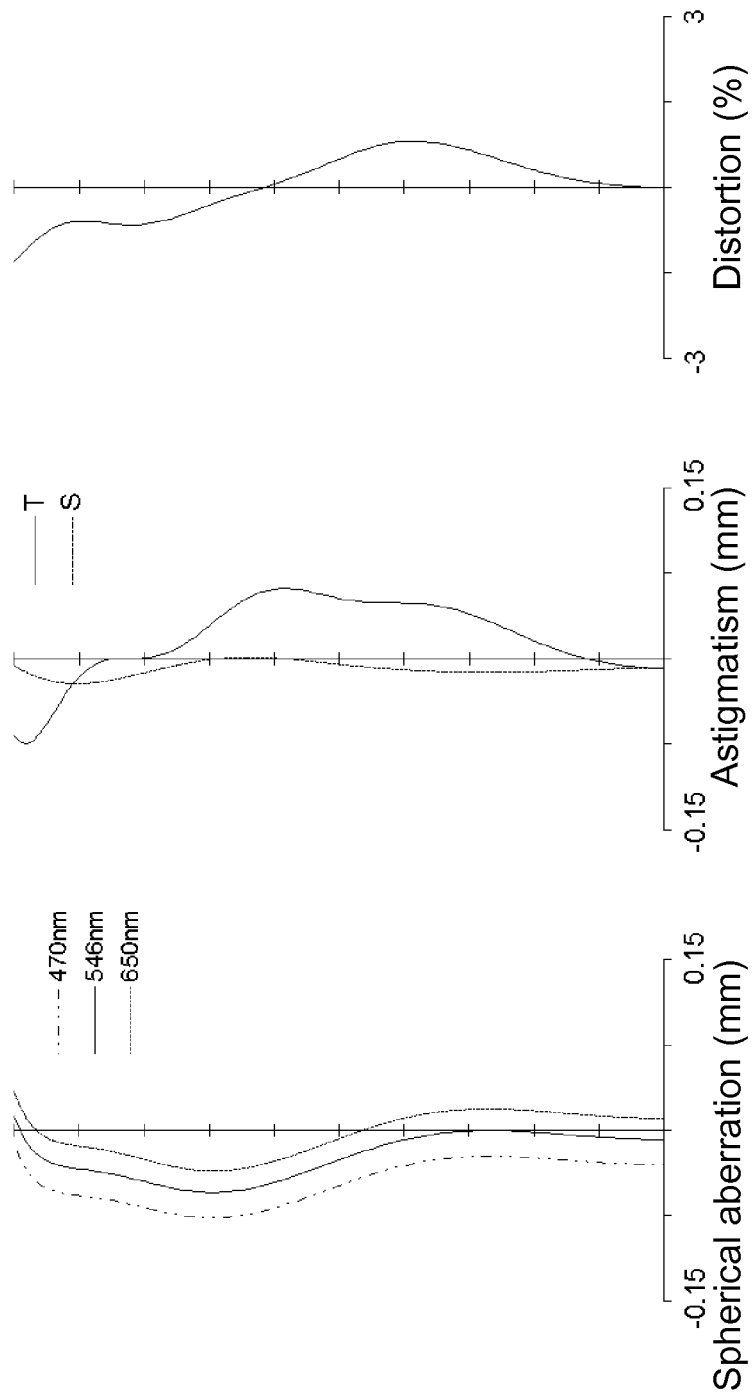
FIG. 3 is an aberration diagram showing a spherical aberration, astigmatism, and a distortion of the imaging lens of FIG. 1.
Figure 4:
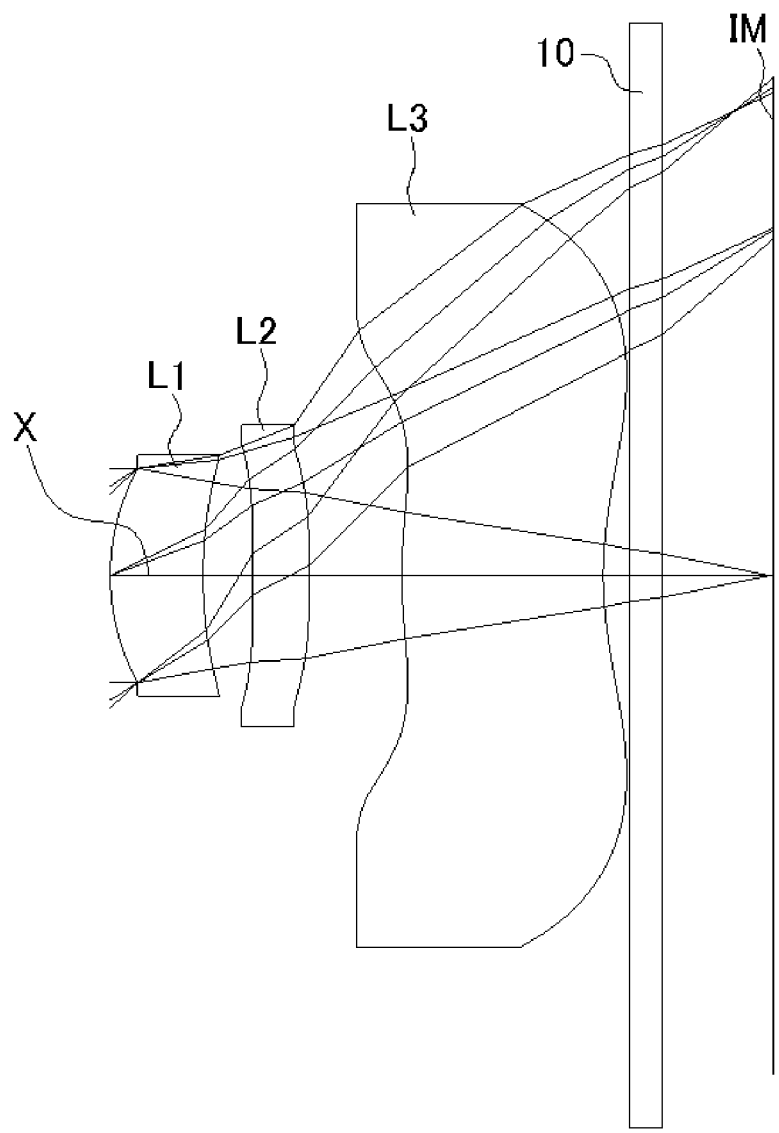
FIG. 4 is a sectional view of a schematic configuration of an imaging lens in Numerical Data Example 2 according to the embodiment of the invention.

FIG. 2 shows a lateral aberration that corresponds to a ratio H of each image height to the maximum image height (hereinafter referred to as "image height ratio H"), which is divided into a tangential direction and a sagittal direction (which is the same in FIGS. 5, 8, 11, and 14). FIG. 3 shows a spherical aberration (mm), astigmatism (mm), and a distortion (%), respectively, for the imaging lens of Numerical Data Example 1. In astigmatism diagram, an aberration on a sagittal image surface S and an aberration on a tangential image surface T are respectively indicated (which are the same in FIGS. 6, 9, 12, and 15). As shown in FIGS. 2 and 3, according to the imaging lens of Numerical Data Example 1, the aberrations are satisfactorily corrected.

NUMERICAL DATA EXAMPLE 2

Basic data are shown below.

f = 2.47 mm, Fno = 2.5, ω = 42.3°
Unit: mm

Surface Data

| Surface Number i | r | d | nd | vd |
|---|---|---|---|---|
| (Object) | ∞ | ∞ | | |
| 1* (Stop) | 1.020 | 0.420 | 1.5438 | 55.6 |
| 2* | 1.960 | 0.227 (=D12) | | |
| 3* | 51.688 | 0.255 | 1.5346 | 56.1 |
| 4* | −11.929 | 0.418 (=D23) | | |
| 5* | 1.982 | 0.913 | 1.5346 | 56.1 |
| 6* | 1.727 | 0.120 | | |
| 7 | ∞ | 0.150 | 1.5168 | 64.2 |
| 8 | ∞ | 0.500 | | |
| (Image plane) | ∞ | | | | f1 = 3.38 mm
f2 = 18.15 mm
f3 = 100.74 mm
La = 2.95 mm

Aspheric Surface Data

First Surface $k = 0.000, A_4 = 2.979E-03, A_6 = 9.314E-01, A_8 = -3.997,$
$A_{10} = -1.952E+01, A_{12} = 7.790E+01, A_{14} = 3.143E+02,$
$A_{16} = -1.106E+03$
Second Surface $k = 0.000, A_4 = -2.583E-02, A_6 = -5.949E-02, A_8 = 3.212,$
$A_{10} = -1.090E+01, A_{12} = -2.567E+01, A_{14} = 1.293E+02,$
$A_{16} = -1.255E+02$ f = 2.47 mm, Fno = 2.5, ω = 42.3°
Unit: mm Third Surface $k = 0.000, A_4 = -9.314E-01, A_6 = 4.109, A_8 = -1.701E+01,$
$A_{10} = 3.585E+01, A_{12} = -1.946E+01, A_{14} = 7.630,$
$A_{16} = -9.161E+01$
Fourth Surface $k = 0.000, A_4 = -1.045, A_6 = 3.075, A_8 = -7.237, A_{10} = 1.033E+01,$
$A_{12} = -2.013, A_{14} = 2.068, A_{16} = -3.957$
Fifth Surface $k = 0.000, A_4 = -6.501E-01, A_6 = 3.372E-01, A_8 = -1.562E-01,$
$A_{10} = -2.154E-01, A_{12} = 3.100E-01, A_{14} = 1.855E-02,$
$A_{16} = -6.969E-02$
Sixth Surface $k = 0.000, A_4 = -2.523E-01, A_6 = 1.929E-02, A_8 = 3.111E-02,$
$A_{10} = -1.193E-02, A_{12} = -7.721E-03, A_{14} = 5.284E-03,$
$A_{16} = -8.925E-04$ The values of the respective conditional expressions are as follows:

(P1 + P3)/P2 = 5.55
D12/D23 = 0.54
f3/f1 = 29.80
f1/f2 = 0.19
f2/f = 7.35

Accordingly, the imaging lens of Numerical Data Example 2 satisfies the above-described conditional expressions. The ratio of the sum of surface spacing La to the focal length f is 1.19, and downsizing of the imaging lens is suitably achieved.

Figure 5:
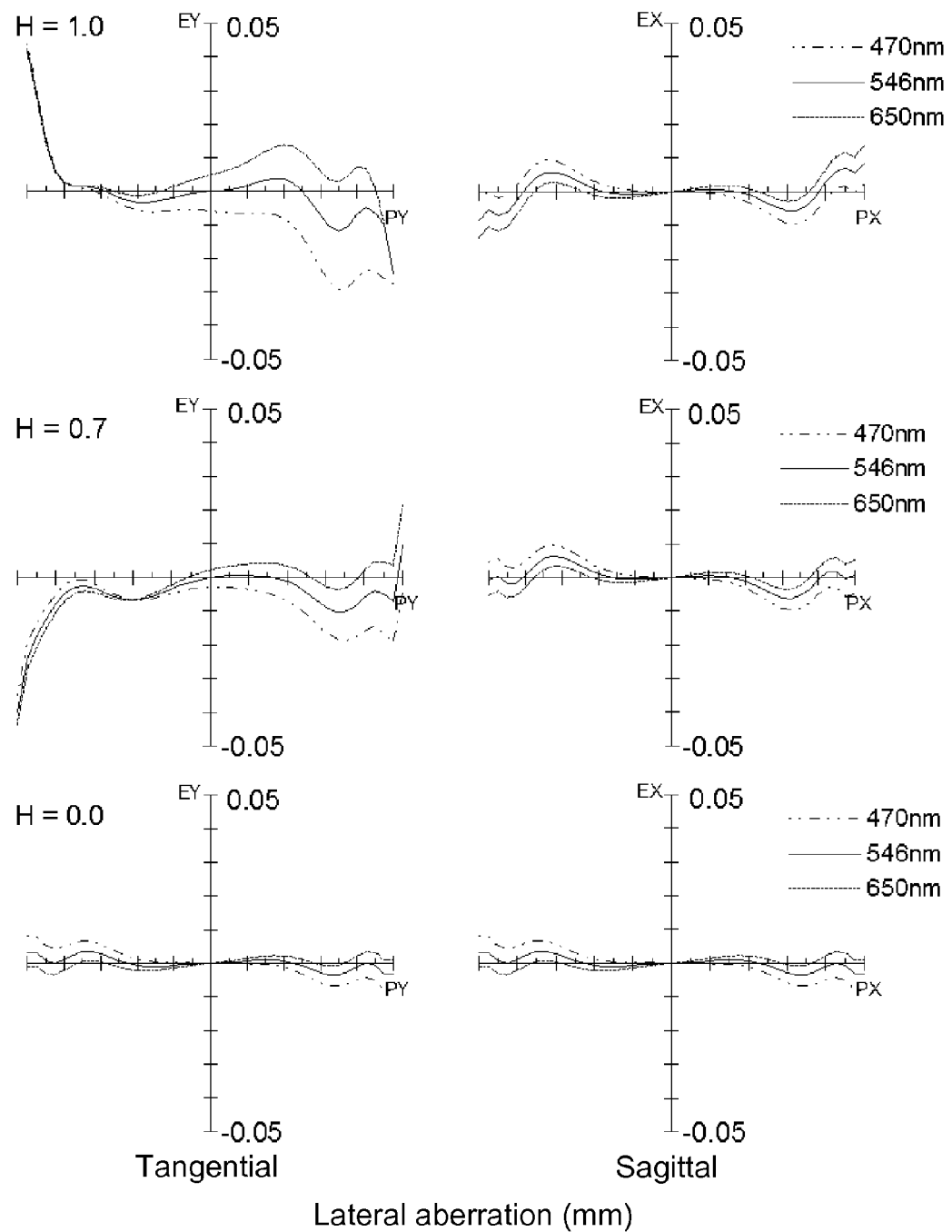
FIG. 5 is an aberration diagram showing a lateral aberration of the imaging lens of FIG. 4.
Figure 6:
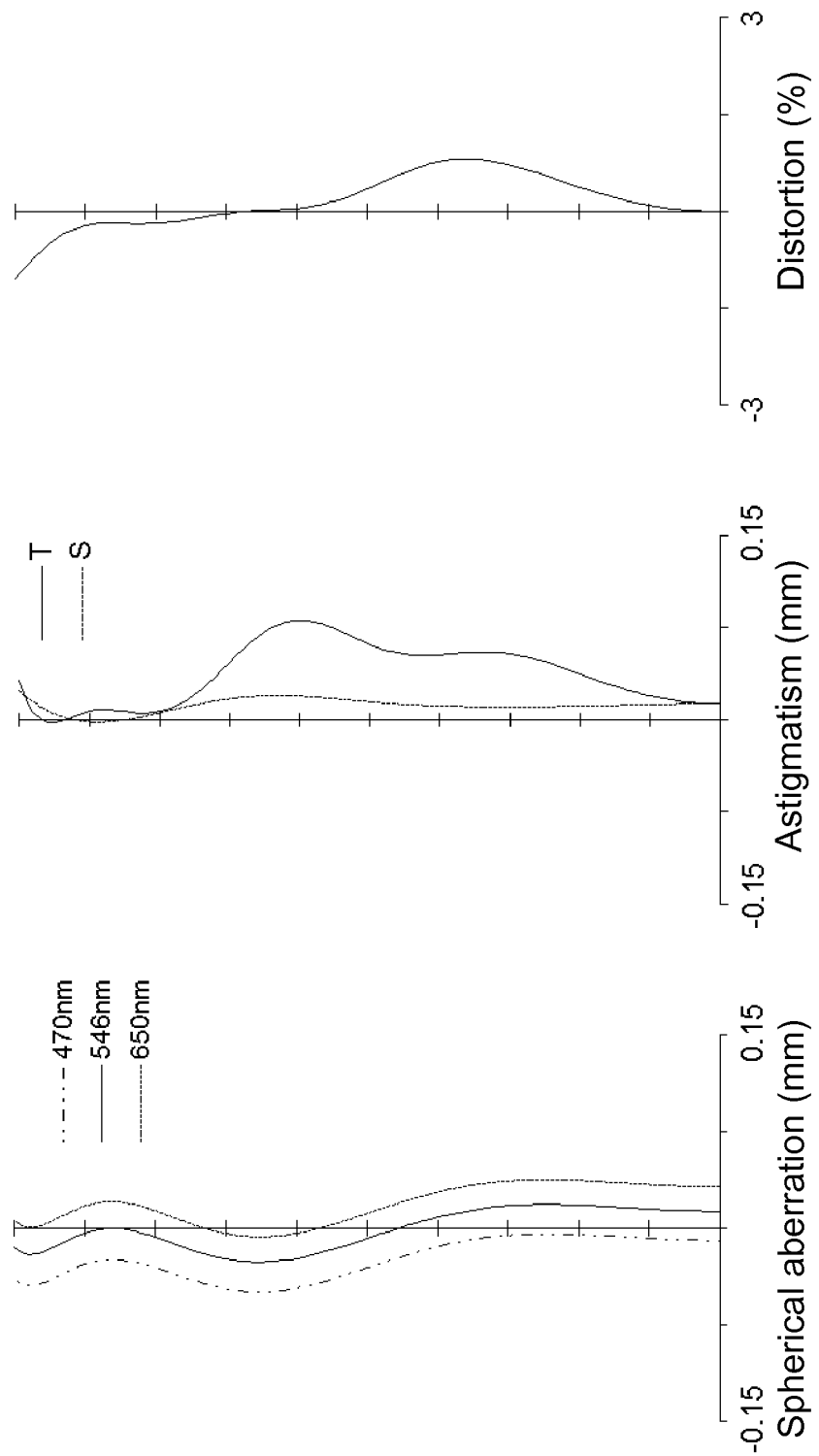
FIG. 6 is an aberration diagram showing a spherical aberration, astigmatism, and a distortion of the imaging lens of FIG. 4.
Figure 7:
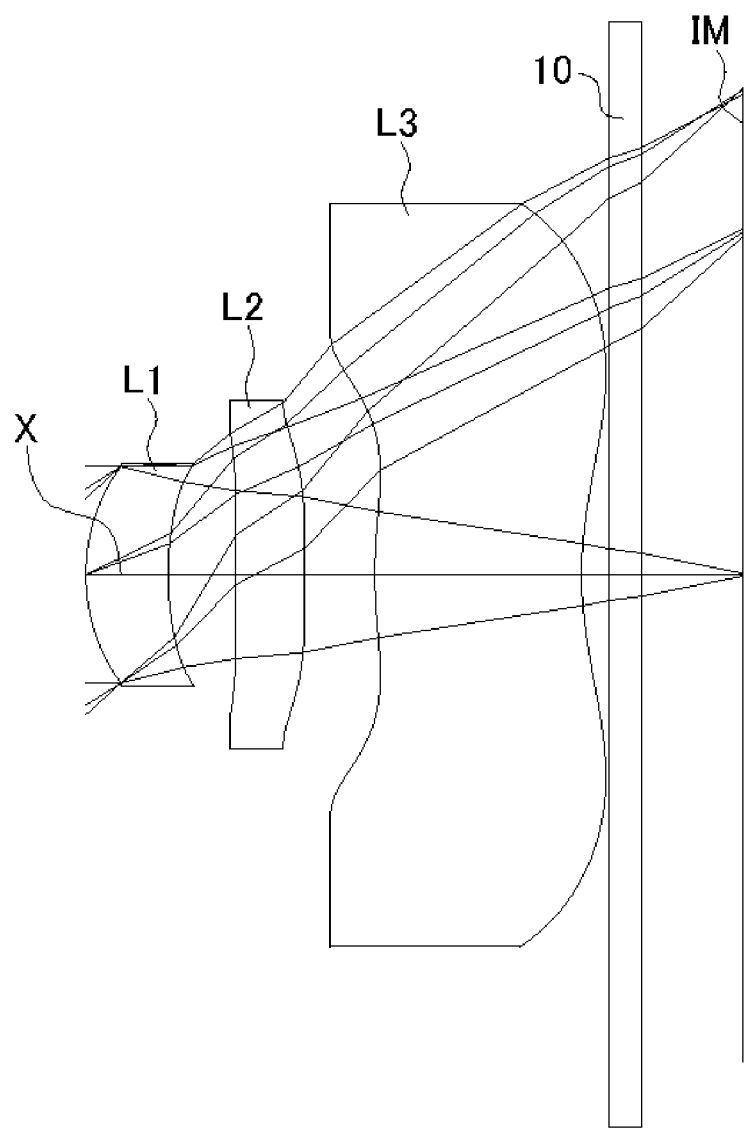
FIG. 7 is a sectional view of a schematic configuration of an imaging lens in Numerical Data Example 3 according to the embodiment of the invention.

FIG. 5 shows the lateral aberration that corresponds to the image height ratio H, and FIG. 6 shows a spherical aberration (mm), astigmatism (mm), and a distortion (%), respectively. As shown in FIGS. 5 and 6, according to the imaging lens of Numerical Data Example 2, the aberrations are also satisfactorily corrected.

NUMERICAL DATA EXAMPLE 3

Basic data are shown below.

f = 2.49 mm, Fno = 2.5, ω = 42.1°
Unit: mm

Surface Data

| Surface Number i | r | d | nd | vd |
|---|---|---|---|---|
| (Object) | ∞ | ∞ | | |
| 1* (Stop) | 0.885 | 0.372 | 1.5346 | 56.1 |
| 2* | 1.500 | 0.305 (=D12) | | |
| 3* | 6.584 | 0.311 | 1.5346 | 56.1 |
| 4* | 12.857 | 0.316 (=D23) | | |
| 5* | 1.986 | 0.935 | 1.5312 | 56.0 |
| 6* | 1.727 | 0.120 | | |
| 7 | ∞ | 0.150 | 1.5168 | 64.2 |
| 8 | ∞ | 0.460 | | |
| (Image plane) | ∞ | | | | f1 = 3.34 mm
f2 = 24.81 mm
f3 = 99.49 mm
La = 2.92 mm

Aspheric Surface Data

First Surface

-continued f = 2.49 mm, Fno = 2.5, ω = 42.1°
Unit: mm $k = 0.000, A_4 = 1.102E-01, A_6 = 5.464E-01, A_8 = -1.970,$
$A_{10} = -1.466E+01, A_{12} = 6.107E+01, A_{14} = 3.134E+02,$
$A_{16} = -1.110E+03$
Second Surface $k = 0.000, A_4 = 4.084E-02, A_6 = 2.054, A_8 = -1.045,$
$A_{10} = -1.485E+01, A_{12} = 7.930, A_{14} = 2.416E+02,$
$A_{16} = -2.945E+02$
Third Surface $k = 0.000, A_4 = -8.414E-01, A_6 = 4.046, A_8 = -1.674E+01,$
$A_{10} = 3.548E+01, A_{12} = -2.514E+01, A_{14} = -2.261,$
$A_{16} = -1.263E+01$
Fourth Surface $k = 0.000, A_4 = -1.089, A_6 = 3.083, A_8 = -7.419, A_{10} = 9.538,$
$A_{12} = -3.420, A_{14} = 1.075, A_{16} = -2.670$
Fifth Surface $k = 0.000, A_4 = -7.161E-01, A_6 = 3.426E-01, A_8 = -1.711E-01,$
$A_{10} = -1.885E-01, A_{12} = 3.494E-01, A_{14} = 3.349E-02,$
$A_{16} = -1.004E-01$
Sixth Surface $k = 0.000, A_4 = -2.384E-01, A_6 = 3.079E-03, A_8 = 3.764E-02,$
$A_{10} = -1.150E-02, A_{12} = -7.920E-03, A_{14} = 5.229E-03,$
$A_{16} = -8.834E-04$ The values of the respective conditional expressions are as follows:

(P1 + P3)/P2 = 7.69
D12/D23 = 0.97
f3/f1 = 29.81
f1/f2 = 0.13
f2/f = 9.96

Accordingly, the imaging lens of Numerical Data Example 3 satisfies the above-described conditional expressions. The ratio of the sum of surface spacing La to the focal length f is 1.17, and downsizing of the imaging lens is suitably achieved.

Figure 8:
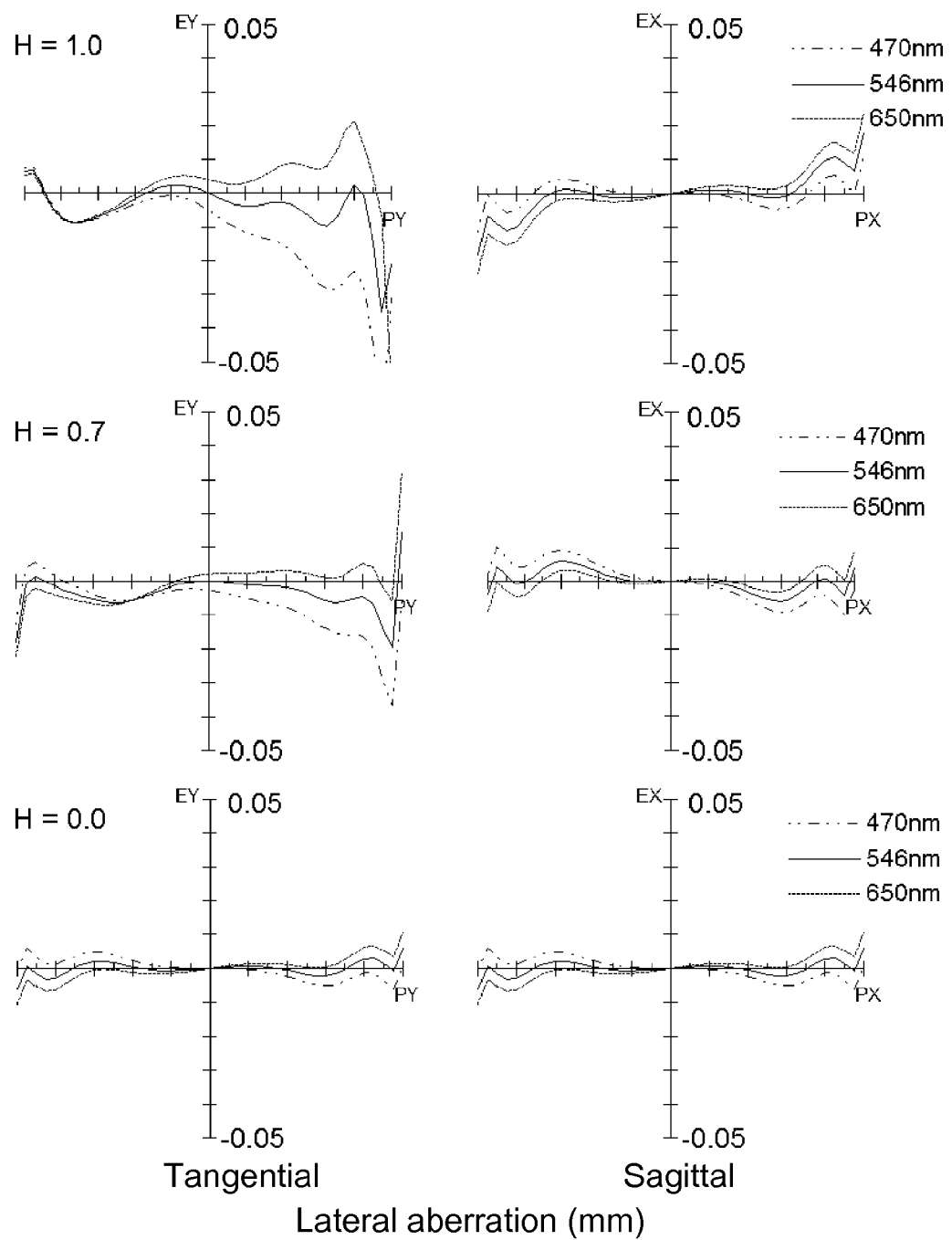
FIG. 8 is an aberration diagram showing a lateral aberration of the imaging lens of FIG. 7.
Figure 9:
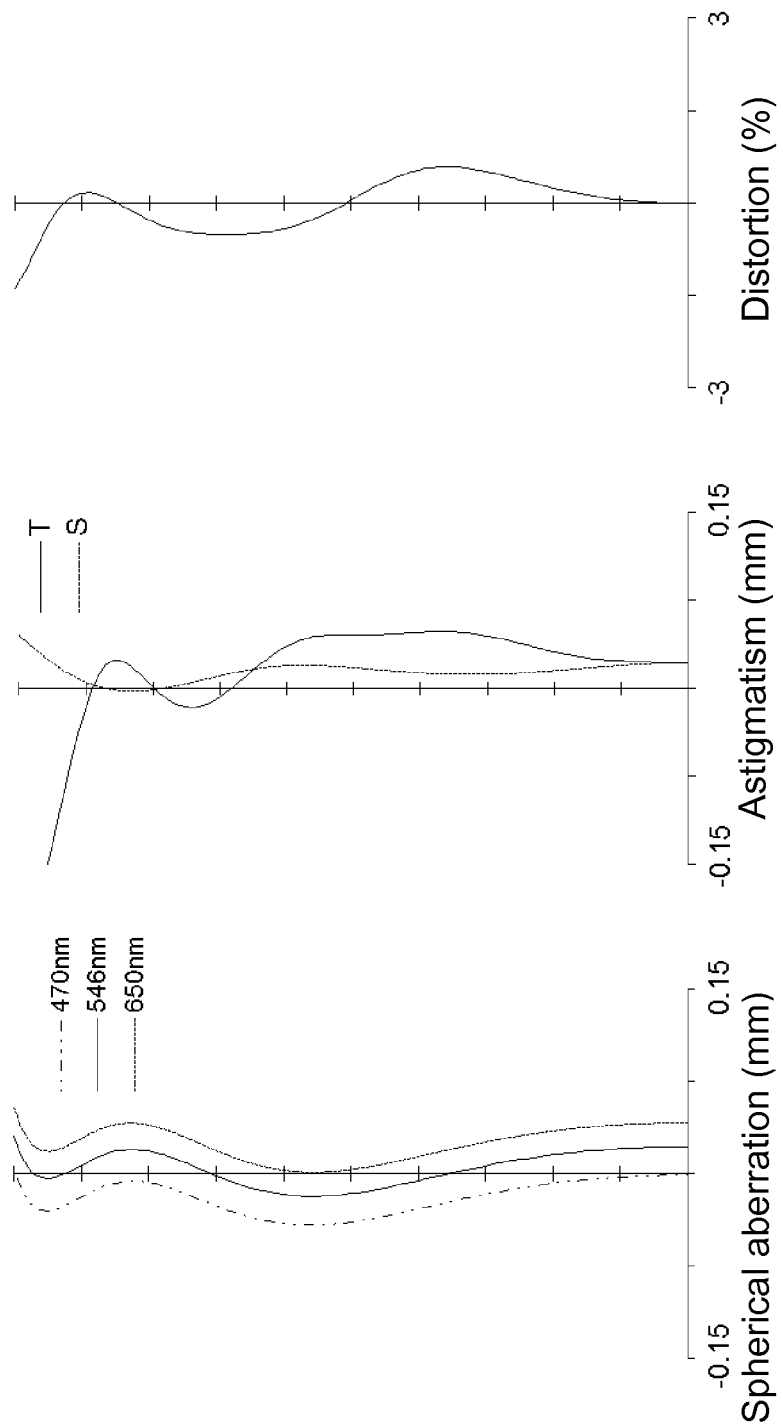
FIG. 9 is an aberration diagram showing a spherical aberration, astigmatism, and a distortion of the imaging lens of FIG. 7.
Figure 10:
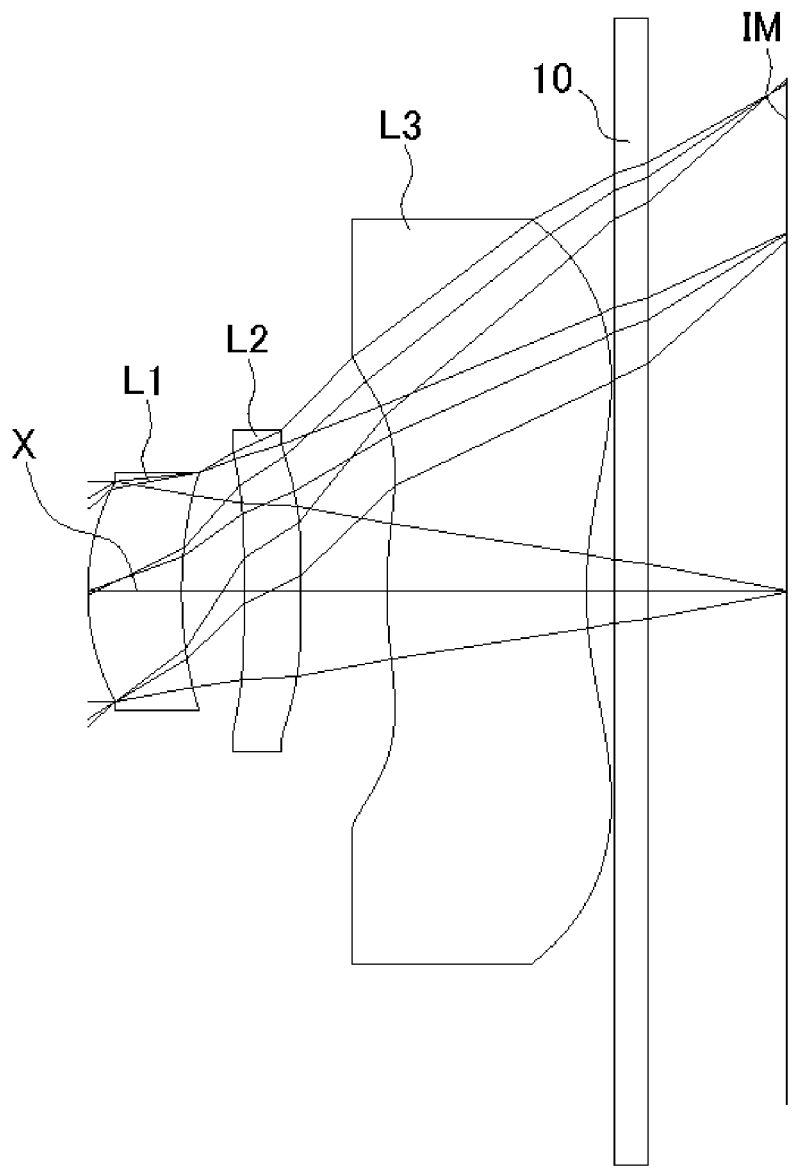
FIG. 10 is a sectional view of a schematic configuration of an imaging lens in Numerical Data Example 4 according to the embodiment of the invention.

FIG. 8 shows the lateral aberration that corresponds to the image height ratio H, and FIG. 9 shows a spherical aberration (mm), astigmatism (mm), and a distortion (%), respectively. As shown in FIGS. 8 and 9, according to the imaging lens of Numerical Data Example 3, the aberrations are satisfactorily corrected.

NUMERICAL DATA EXAMPLE 4

Basic data are shown below.

f = 2.53 mm, Fno = 2.6, ω = 41.6°
Unit: mm

Surface Data

| Surface Number i | r | d | nd | νd |
|---|---|---|---|---|
| (Object) | ∞ | ∞ | | |
| 1* (Stop) | 1.030 | 0.411 | 1.5346 | 56.1 |
| 2* | 1.943 | 0.271 (=D12) | | |
| 3* | 34.804 | 0.250 | 1.5438 | 55.6 |
| 4* | −22.620 | 0.374 (=D23) | | |
| 5* | 1.761 | 0.872 | 1.5346 | 56.1 |
| 6* | 1.707 | 0.120 | | |
| 7 | ∞ | 0.150 | 1.5168 | 64.2 |
| 8 | ∞ | 0.607 | | |
| (Image plane) | ∞ | | | |

-continued f = 2.53 mm, Fno = 2.6, ω = 41.6°
Unit: mm f1 = 3.54 mm
f2 = 25.25 mm
f3 = 22.59 mm
La = 3.00 mm Aspheric Surface Data First Surface $k = 0.000, A_4 = 3.408E-02, A_6 = 7.889E-01, A_8 = -3.881,$
$A_{10} = -1.795E+01, A_{12} = 8.232E+01, A_{14} = 3.127E+02,$
$A_{16} = -1.189E+03$
Second Surface $k = 0.000, A_4 = -1.966E-02, A_6 = 2.825E-01, A_8 = 3.307,$
$A_{10} = -1.174E+01, A_{12} = -2.719E+01, A_{14} = 1.322E+02,$
$A_{16} = -8.942E+01$
Third Surface $k = 0.000, A_4 = -9.018E-01, A_6 = 4.135, A_8 = -1.706E+01,$
$A_{10} = 3.533E+01, A_{12} = -2.052E+01, A_{14} = 1.076E+01,$
$A_{16} = -6.001E+01$
Fourth Surface $k = 0.000, A_4 = -1.068, A_6 = 2.993, A_8 = -7.375, A_{10} = 1.014E+01$
$A_{12} = -2.235, A_{14} = 1.786, A_{16} = -4.567$
Fifth Surface $k = 0.000, A_4 = -6.657E-01, A_6 = 3.202E-01, A_8 = -1.582E-01,$
$A_{10} = -2.109E-01, A_{12} = 3.145E-01, A_{14} = 2.067E-02,$
$A_{16} = -7.033E-02$
Sixth Surface $k = 0.000, A_4 = -2.519E-01, A_6 = 1.750E-02, A_8 = 3.163E-02,$
$A_{10} = -1.182E-02, A_{12} = -7.730E-03, A_{14} = 5.276E-03,$
$A_{16} = -8.944E-04$ The values of the respective conditional expressions are as follows:

(P1 + P3)/P2 = 8.25
D12/D23 = 0.73
f3/f1 = 6.38
f1/f2 = 0.14
f2/f = 9.98

Accordingly, the imaging lens of Numerical Data Example 4 satisfies the above-described conditional expressions. The ratio of the sum of surface spacing La to the focal length f is 1.19, and downsizing of the imaging lens is suitably achieved.

Figure 11:
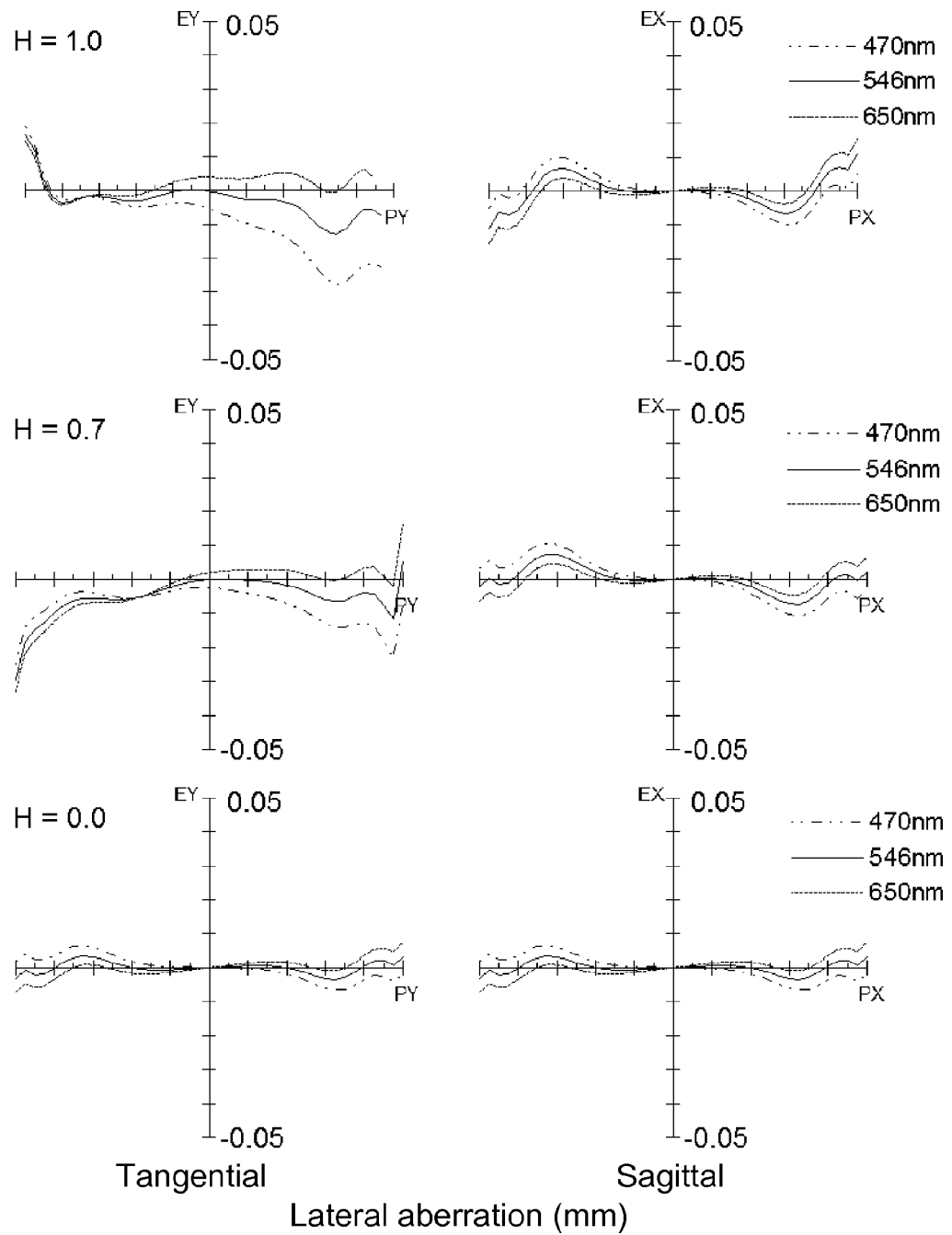
FIG. 11 is an aberration diagram showing a lateral aberration of the imaging lens of FIG. 10.
Figure 12:
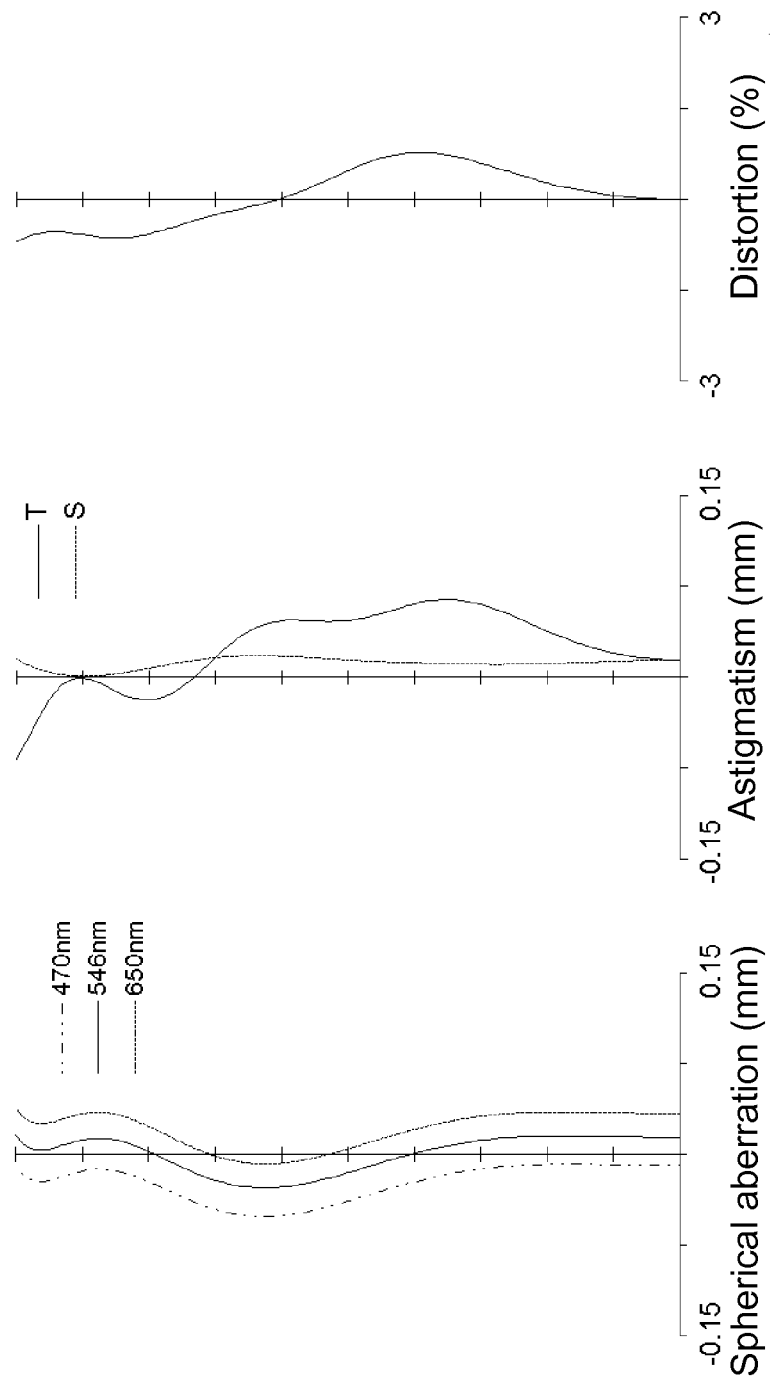
FIG. 12 is an aberration diagram showing a spherical aberration, astigmatism, and a distortion of the imaging lens of FIG. 10.
Figure 13:
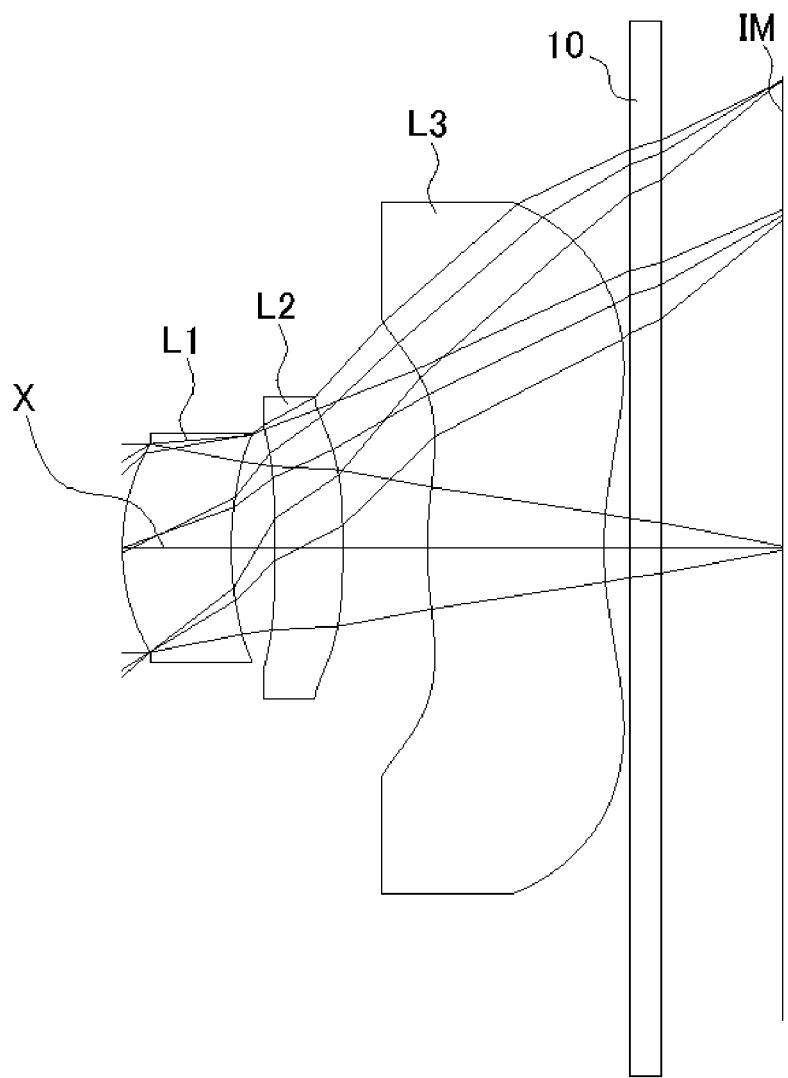
FIG. 13 is a sectional view of a schematic configuration of an imaging lens in Numerical Data Example 5 according to the embodiment of the invention.

FIG. 11 shows the lateral aberration that corresponds to the image height ratio H, and FIG. 12 shows a spherical aberration (mm), astigmatism (mm), and a distortion (%), respectively. As shown in FIGS. 11 and 12, according to the imaging lens of Numerical Data Example 4, the aberrations are also satisfactorily corrected.

NUMERICAL DATA EXAMPLE 5

Basic data are shown below.

f = 2.54 mm, Fno = 2.6, ω = 41.5°
Unit: mm

Surface Data

| Surface Number i | r | d | nd | νd |
|---|---|---|---|---|
| (Object) | ∞ | ∞ | | |
| 1* (Stop) | 1.014 | 0.516 | 1.5346 | 56.1 |

-continued f = 2.54 mm, Fno = 2.6, ω = 41.5°
Unit: mm

| | | | | |
|---|---|---|---|---|
| 2* | 1.737 | 0.206 (=D12) | | |
| 3* | −66.072 | 0.320 | 1.5346 | 56.1 |
| 4* | −7.586 | 0.401 (=D23) | | |
| 5* | 1.816 | 0.834 | 1.5346 | 56.1 |
| 6* | 1.775 | 0.120 | | |
| 7 | ∞ | 0.150 | 1.5168 | 64.2 |
| 8 (Image plane) | ∞ | 0.577 | | |
| | ∞ | | | | f1 = 3.65 mm
f2 = 16.00 mm
f3 = 24.08 mm
La = 3.07 mm

Aspheric Surface Data

First Surface k = 0.000, $A_4$ = 5.070E−02, $A_6$ = 6.298E−01, $A_8$ = −3.426,
$A_{10}$ = −1.689E+01, $A_{12}$ = 8.129E+01, $A_{14}$ = 3.015E+02,
$A_{16}$ = −1.175E+03
Second Surface k = 0.000, $A_4$ = −3.556E−02, $A_6$ = 3.876E−01, $A_8$ = 3.229,
$A_{10}$ = −1.028E+01, $A_{12}$ = −2.119E+01, $A_{14}$ = 1.380E+02,
$A_{16}$ = −1.510E+02
Third Surface k = 0.000, $A_4$ = −1.002, $A_6$ = 4.153, $A_8$ = −1.689E+01,
$A_{10}$ = 3.589E+01, $A_{12}$ = −1.958E+01, $A_{14}$ = 1.054E+01,
$A_{16}$ = −6.462E+01
Fourth Surface k = 0.000, $A_4$ = −1.053, $A_6$ = 2.855, $A_8$ = −7.483, $A_{10}$ = 1.004E+01,
$A_{12}$ = −2.327, $A_{14}$ = 1.869, $A_{16}$ = −3.860
Fifth Surface k = 0.000, $A_4$ = −6.588E−01, $A_6$ = 3.478E−01, $A_8$ = −1.780E−01,
$A_{10}$ = −2.327E−01, $A_{12}$ = 3.026E−01, $A_{14}$ = 1.966E−02,
$A_{16}$ = −6.249E−02
Sixth Surface k = 0.000, $A_4$ = −2.639E−01, $A_6$ = 2.456E−02, $A_8$ = 2.993E−02,
$A_{10}$ = −1.217E−02, $A_{12}$ = −7.583E−03, $A_{14}$ = 5.340E−03,
$A_{16}$ = −9.198E−04

The values of the respective conditional expressions are as follows:

(P1 + P3)/P2 = 8.25
D12/D23 = 0.73
f3/f1 = 6.38
f1/f2 = 0.14
f2/f = 9.98

Accordingly, the imaging lens of Numerical Data Example 5 satisfies the above-described conditional expressions. The ratio of the sum of surface spacing La to the focal length f is 1.21, and downsizing of the imaging lens is suitably achieved. Here, any lenses that compose the imaging lens of Numerical Data Example 5 are made of the same material, and thereby the manufacturing cost of the imaging lens is restrained.

Figure 14:
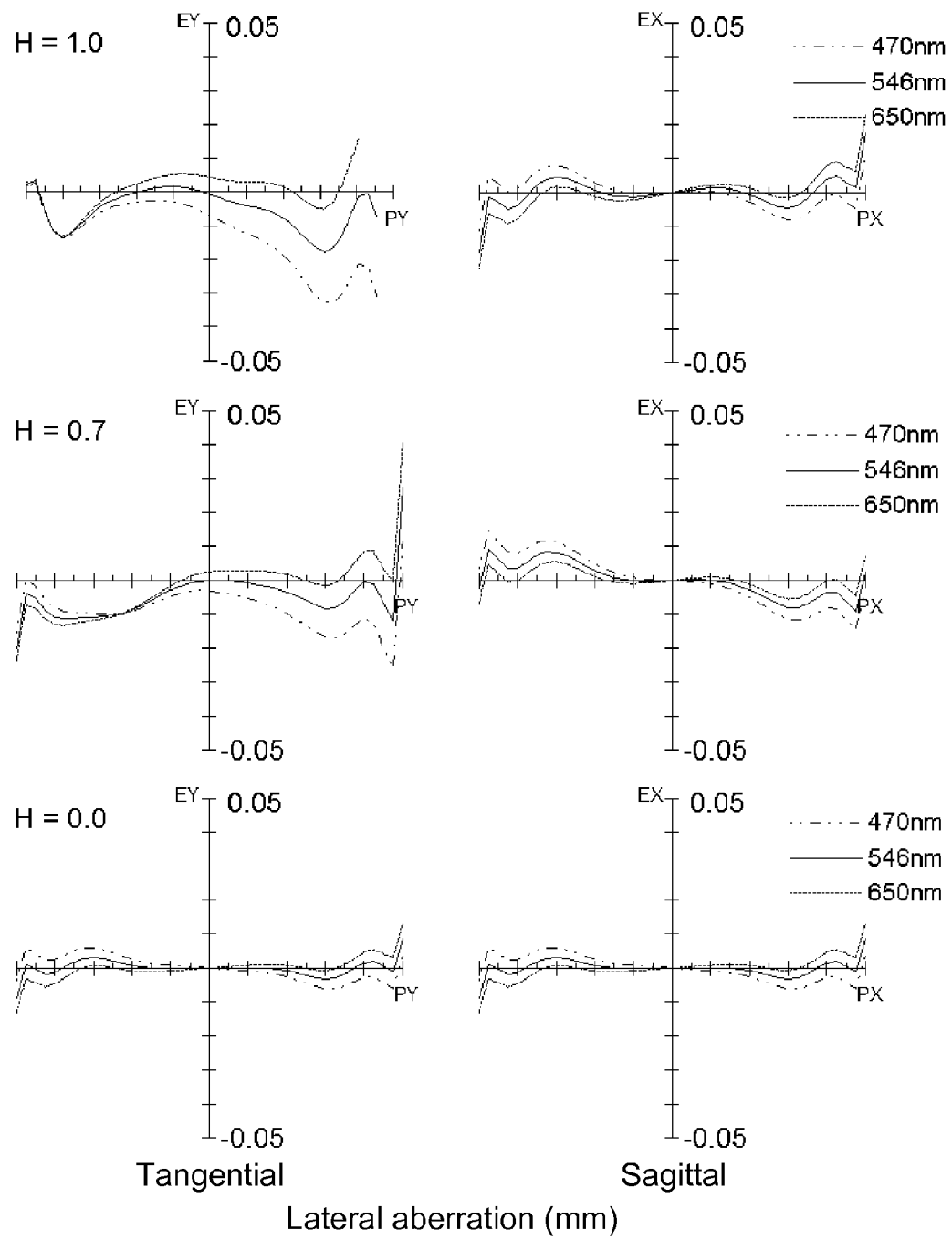
FIG. 14 is an aberration diagram showing a lateral aberration of the imaging lens of FIG. 13.
Figure 15:
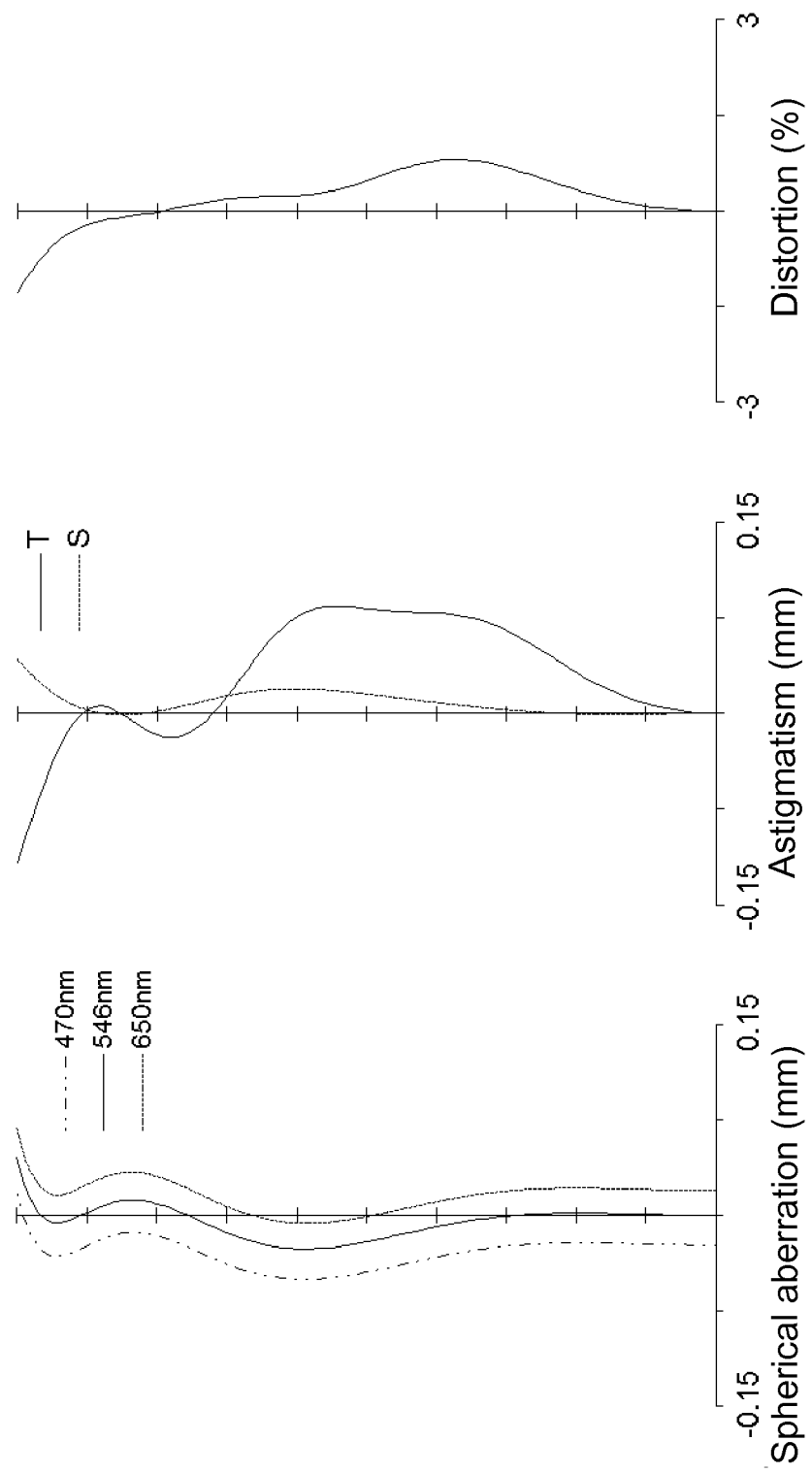
FIG. 15 is an aberration diagram showing a spherical aberration, astigmatism, and a distortion of the imaging lens of FIG. 13.

FIG. 14 shows the lateral aberration that corresponds to the image height ratio H, and FIG. 15 shows a spherical aberration (mm), astigmatism (mm), and a distortion (%), respectively. As shown in FIGS. 14 and 15, according to the imaging lens of Numerical Data Example 5, the aberrations are satisfactorily corrected.

With increasing variety of functions of cellular phones and smart phones, an imaging lens for mounting in those camera devices is even required to have a wider angle than before. By mounting an imaging lens having a wide angle in a camera, it is not only achievable to take an image over a wider range, but also possible to clip an image in a desired range out of an image taken in a wide range upon fabrication of the image taken. Since the imaging lens of the embodiment has relatively wide angle of view, it is achievable to fully meet those demands.

Moreover, with advancement in downsizing of cameras, a small-sized imaging element has been mounted in the aforementioned cameras. In case of a small-sized imaging element, since a light-receiving area of each pixel is generally small, there is an issue of a dark image in comparison with an image taken by a large imaging element having the same number of pixels. As a method of solving such problem, there is a method that improves a light-receiving sensitivity of an imaging element using an electric circuit. However, when the light-receiving sensitivity increases, a noise component that does not contribute directly to the image formation is also amplified, so that it is often necessary to have another electric circuit to reduce or eliminate noises. Since the imaging lens of the embodiment has a relatively small F number, it is achievable to obtain sufficiently bright image without such electric circuit or the like. Moreover, because of its small F number, it is possible to obtain a bright image even in a relatively dark environment, so that it is possible to provide the imaging lens for use in new applications of cellular phones and smart phones.

Accordingly, when the imaging lens of the embodiment or the imaging device equipped with the imaging lens is mounted in a camera such as cellular phones, smartphones, and portable devices such as portable information terminals, digital still cameras, security cameras, onboard cameras, and network cameras, it is possible to attain both high functionality and downsizing of the cameras.

The disclosure of Japanese Patent Application No. 2013-156592, filed on Jul. 29, 2013, is incorporated in the application by reference.

While the invention has been explained with reference to the specific embodiments of the invention, the explanation is illustrative and the invention is limited only by the appended claims.

What is claimed is:

1. An imaging lens comprising:
a first lens having positive refractive power;
a second lens having positive refractive power; and
a third lens having positive refractive power, arranged in this order from an object side to an image plane side,
wherein said first lens is formed in a shape so that a surface thereof on the object side and a surface thereof on the image plane side have positive curvature radii,
said third lens is formed in a shape so that a surface thereof on the object side and a surface thereof on the image plane side have positive curvature radii, and
said first lens has a refractive power P1, said second lens has a refractive power P2, said third lens has a refractive power P3, said first lens has a focal length f1, and said third lens has a focal length f3 so that the following conditional expressions are satisfied:

$5.0<(P1+P3)/P2<8.5$ $6<f3/f1<30.$

2. The imaging lens according to claim 1, wherein said first lens and said second lens are arranged so that the surface of the first lens on the image plane side is away from a surface of the second lens on the object side by a distance D12 on an optical axis, and
said second lens and said third lens are arranged so that a surface of the second lens on the image plane side is away from the surface of the third lens on the object side by a distance D23 on the optical axis so that the following conditional expression is satisfied:

$$0.5 < D12/D23 < 1.0.$$

3. The imaging lens according to claim 1, wherein said second lens has a focal length f2 so that the following conditional expression is satisfied:

$$0.1 < f1/f2 < 0.3.$$

4. The imaging lens according to claim 1, wherein said second lens has a focal length f2 so that the following conditional expression is satisfied:

$$5 < f2/f < 10$$

where f is a focal length of a whole lens system.

5. The imaging lens according to claim 1, wherein said first lens has an Abbe's number vd1, said second lens has an Abbe's number vd2, and said third lens has an Abbe's number vd3 so that the following conditional expressions are satisfied:

$$45 < vd1 < 75$$

$$45 < vd2 < 75$$

$$45 < vd3 < 75.$$

* * * * *